United States Patent
Nakamura et al.

[11] Patent Number: 5,825,591
[45] Date of Patent: Oct. 20, 1998

[54] FRICTIONALLY SLIDING HEAD MAGNET DISK APPARATUS

[75] Inventors: Takao Nakamura; Nobuya Sekiyama; Keiko Nakano; Kenji Furusawa; Hiroyuki Kataoka, all of Yokohama; Takaaki Shirakura, Chigasaki; Shinya Matsuoka, Odawara, all of Japan

[73] Assignee: Hitachi, Ltd., Tokyo, Japan

[21] Appl. No.: 768,958

[22] Filed: Dec. 18, 1996

Related U.S. Application Data

[63] Continuation of Ser. No. 279,204, Jul. 22, 1994, abandoned.

[30] Foreign Application Priority Data

Jul. 23, 1993 [JP] Japan .................................. 5-182283

[51] Int. Cl.$^6$ .............................. G11B 5/48; G11B 21/16
[52] U.S. Cl. .......................... 360/104; 360/103; 360/110
[58] Field of Search .................................. 360/103, 104, 360/135, 110, 122, 129, 130.39; 451/28; 428/141

[56] References Cited

U.S. PATENT DOCUMENTS

| | | | |
|---|---|---|---|
| 3,466,156 | 9/1969 | Peters et al. ............................ | 360/103 |
| 4,735,840 | 4/1988 | Hedgcoth . | |
| 4,901,189 | 2/1990 | Kubo et al. ............................ | 360/104 |
| 5,118,577 | 6/1992 | Brar et al. ............................ | 360/103 X |
| 5,140,569 | 8/1992 | Neobashi ............................ | 360/103 X |
| 5,365,700 | 11/1994 | Sawada et al. ............................ | 451/28 |

FOREIGN PATENT DOCUMENTS

| | | |
|---|---|---|
| 59-082626 | 5/1984 | Japan . |
| 60-133538 | 7/1985 | Japan . |
| 62-257976 | 4/1987 | Japan . |
| 62-203748 | 9/1989 | Japan . |
| 4-134770 | 2/1992 | Japan . |
| 4-114379 | 4/1992 | Japan . |

*Primary Examiner*—Tom Thomas
*Assistant Examiner*—Adriana Giordana
*Attorney, Agent, or Firm*—Fay, Sharpe, Beall, Fagan, Minnich, & McKee

[57] ABSTRACT

The present invention relates to a magnetic disk unit of a high memory capacity wherein a magnetic head and a magnetic disk with a lubricant layer formed on the surface thereof are allowed to perform a relative motion in a mutually contacted state to write and read out information of a high recording density, and the invention is also concerned with the shape and material of the magnetic head suitable for a continual sliding motion of the head on the magnetic disk surface, as well as the lubricant layer formed on the disk surface. According to the present invention, the magnetic head, which has a slider surface of a predetermined curvature, is supported by an arm through a spring and is pushed onto the magnetic disk surface with the lubricant layer formed thereon, then with rotation of the magnetic disk, the lubricant layer liquefies and information is recorded or read out in a contacted state of the head and the disk. The distance between the magnetic head and the disk surface can be shortened to a great extent and the recording density of the magnetic disk can be increased remarkably, thereby permitting a larger capacity of the magnetic disk unit.

18 Claims, 9 Drawing Sheets

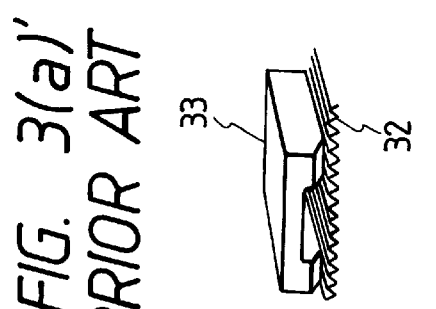
FIG. 3(a) PRIOR ART
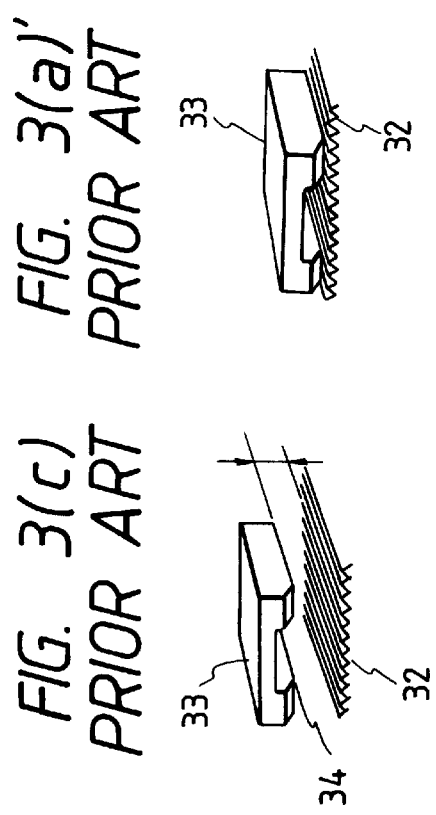
FIG. 3(b) PRIOR ART
FIG. 3(c) PRIOR ART
FIG. 3(a)' PRIOR ART
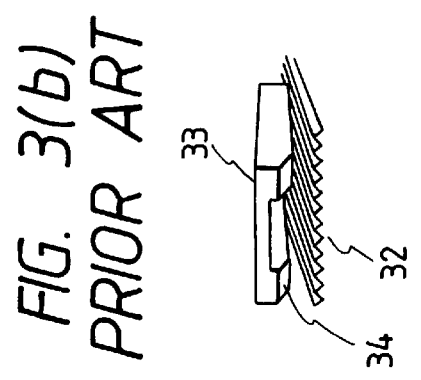
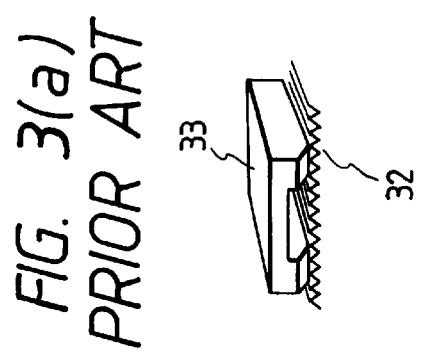
FIG. 4 PRIOR ART
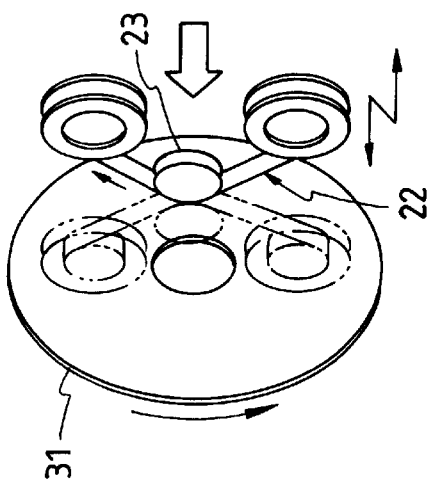

FRICTIONALLY SLIDING HEAD MAGNET DISK APPARATUS

This is a continuation of U.S. application Ser. No. 08/279,204 filed Jul. 22, 1994, now abandoned.

BACKGROUND OF THE INVENTION

The present invention relates to a magnetic disk unit of a high recording capacity and more particularly to a magnetic disk unit wherein in order to minimize the distance between a recording medium present on the surface of a magnetic disk and a magnetic head element as a constituent of a magnetic head, the magnetic head and the magnetic disk are allowed to move relative to each other in a mutually contacted state to thereby write and read information.

Heretofore, a magnetic disk unit has usually been employed as a recorder in a computer or a word processor, but there has been a demand from the users for further increase of the memory capacity and further reduction of the size.

The magnetic disk unit mainly comprises a magnetic disk portion having a plurality of magnetic disks and a magnetic head assembly having a plurality of arms with magnetic heads fixed thereto respectively.

According to such conventional magnetic disk unit as referred to above, as illustrated in FIG. 1 which is a schematic diagram explanatory of operation, a magnetic head 33 is allowed to float above a magnetic disk 32 having a magnetic thin film formed thereon by a thin film forming technique such as sputtering, plating or ion plating, to write and read information with respect to the surface of the magnetic disk 32.

The floating principle of the magnetic head 33 utilizes a dynamic pressure of air induced by rotation of the magnetic disk 32 and present between the disk 32 and the head 33.

Therefore, the floating gap of the magnetic head 33 from the surface of the magnetic disk 32 is influenced by the number of revolutions of the disk 32 and a relative velocity V between the head 33 and the disk 32, and it varies depending on the strength of a spring 36 anchored to each arm 35, the shape of a sliding surface 34 of the magnetic head 33, etc.

Heretofore, the floating gap of the magnetic head 33 from the surface of the magnetic disk 32 has been in the range of 0.1 to 0.2 $\mu$m and thus very small. Therefore, in order to keep the magnetic head 33 in a stably floating state above the surface of the magnetic disk 32, the disk surface is required to have very small surface roughness and flatness.

For satisfying the above requirement there have so far been conducted (1) the development of materials for the magnetic disk substrate and of a high precision flat work technique, (2) the development of a surface machining technique for smoothing the surface of a magnetic disk comprising a magnetic disk substrate and a thin film formed thereon and (3) the development of a magnetic head supporting system for improving the follow-up property of a magnetic head.

For example, reference will now be made to the substrate for magnetic disk. As shown in FIG. 2, both sides of an aluminum alloy substrate 31 having a plated surface (e.g. Ni-P, nickel-phosphorus, plating, also in the following) several 10 $\mu$m in thickness are ground by means of a simultaneous both-side machining apparatus and using a tool comprising elastic grindstones attached to surface plates 20 and 21 which are disposed above and below the substrate 31. Further, with a non-woven abrasive cloth affixed to each of the upper and lower surface plates 20, 21 and using abrasives of various grain sizes, both sides of the substrate are ground up to a surface roughness of 0.5 nmRa to 1.8 nmRa, 3.2 nmRmax to 8.5 nmRmax.

The surface roughness will now be explained with reference to FIGS. 3(a) to 3(c). As shown in FIG. 3(a), when the operation of the magnetic disk unit is stopped, the magnetic head 33 is pushed down into contact with the surface of the magnetic disk 32 by means of a spring (not shown) attached to the arm, while upon operation of the magnetic disk unit, as shown in FIG. 3(b), the magnetic head 33 slides on the disk surface. Further, as shown in FIG. 3(c), the magnetic head 33 floats above the disk surface under the action of a motion mechanism which is called a contact start-stop mechanism and will hereinafter be referred to as the CSS mechanism.

The magnetic head 33 which has thus floated like FIGS. 3(a) to 3(c) again takes the form of FIG. 3(a) for stopping. (FIG. 3(a)' after FIG. 3(c) shows the same form as the initial form of FIG. 3(a).) In this case, however, if the surface of the magnetic disk 32 is a smooth surface having a surface roughness falling under the foregoing range, there will arise adhesion between the magnetic head sliding surface 34 which is a mirror surface and the surface of the magnetic disk 32, resulting in the disk 32 failing to turn during operation of the magnetic disk unit or causing breakage of the magnetic head 33.

In order to solve the above-mentioned problem, a so-called texture machining is applied to the ground surface of the plated substrate 31. According to the texture machining, as shown in FIG. 4, a polishing tape 22 of a fine abrasive is pushed against the ground surface of the substrate by means of a contact roller 23 to form such fine grooves of several ten nanometers in terms of the size of uneven surface as shown in FIG. 5 in the circumferential direction of the plated substrate 31.

As described in Japanese Patent Laid Open Nos. 59-82626 and 62-203748, the surface roughness is increased to 4–8 nmRa by the texture machining to form fine convexes and concaves on the substrate surface. By this machining, the possible adhesion between the magnetic head and the magnetic disk in the CSS mechanism is avoided, and the magnetic characteristics of the magnetic medium formed on the magnetic disk surface are improved, as described in U.S. Pat. No. 4,735,840.

In the magnetic disk unit, notwithstanding the foregoing problem, the floating height of the magnetic head from the magnetic disk surface is set very small for increasing the memory capacity, which height is required to be not larger than 0.2 $\mu$m, even not larger than 0.1 $\mu$m, and it is also required that the revolution of the magnetic disk be set higher than the conventional 3,600 rpm in order to shorten the access time which corresponds to the speed of recording and that of reading.

Thus, for ensuring stable floating of the magnetic head above the magnetic disk surface and improving the reliability of the magnetic disk unit, it is necessary to control the height of the fine irregularity, especially that of microprotrusions, uniformly. This has been an important subject to be attained.

According to a conventional method adopted for decreasing the floating height of the magnetic head from the magnetic disk surface to attain a higher recording density, the surface of a magnetic disk obtained by forming an under layer (e.g. Cr: chromium layer), a magnetic layer (e.g.

Co-Cr: cobalt-chromium layer) and a protective layer (e.g. C: carbon layer) successively on a plated substrate 31 is machined using a polishing tape or by head burnishing to diminish microprotrusions.

Also as to the surface roughness after texture machining, from the standpoint of improving the floating characteristic, there have been conducted a floating characteristic test and a CSS characteristic test of a magnetic head for magnetic disks of 4 nmRa or below to 2 nmRa close to the both-side ground surface roughness or below. As a result, the following became clear.

(1) As the grain size of abrasive used in the texture machining is made smaller, the surface roughness of the machined surface becomes smaller and the floating characteristic of the magnetic head is improved. However, it is impossible to completely eliminate machining defects such as scratches on the machined surface, which scratches are the greatest cause of deterioration in the floating characteristic of the magnetic head. As the surface roughness is made smaller by the texture machining, the magnetic head adhesion and the resistance to the magnetic head in the CSS mechanism increase, so that the damage or crush of the magnetic head occurs more easily.

(2) Machining defects such as scratch on the texture-machined surface cause an error when information is read out by the magnetic head.

(3) The occurrence of scratch on the texture-machined surface is greatly influenced by the dispersion in the grain size of abrasive used in the texture machining and also by agglomerated coarse particles. This becomes more marked as the abrasive grain size becomes smaller, and the scratch becomes more influential as the surface roughness of the texture-machined surface becomes smaller.

(4) In a magnetic disk having thin films formed on the faces of a both-side ground, plated substrate, a magnetism coercivity Hc which represents a magnetic characteristic is small and there is little magnetic anisotropy (the ratio of a radial coercivity to a circumferential coercivity of the magnetic disk), thus giving rise to the problem of insufficiency. Besides, there occurs the adhesion of magnetic head as noted previously, thus posing a problem in point of reliability of the magnetic disk unit.

The shape of the conventional magnetic head 33 will now be explained. As shown in FIG. 6(*b*), with rotation of the magnetic disk 32, the magnetic head 33 is allowed to float under a dynamic pressure created by a current of air present between the magnetic head 33 fixed to the arm 35 and the magnetic disk 32.

For stabilizing such floating action, as shown in FIG. 6(*a*), there is used a slider 39 which constitutes the magnetic head 33 and which is formed of a ceramic material or the like, with an air bearing surface of, say, 400 $\mu$m or so in width and 4 mm or so in length being formed on the side of the slider 39 which side faces the magnetic disk 32. The air bearing surface is formed with air inflow portions 36 for facilitating the inflow of air to the portion of the slider surface 34. Magnetic head elements 37 are provided on the side opposite to the air inflow portions 36 of the slider 39.

The magnetic head 33 having the air bearing surface is pushed against the surface of the magnetic disk 32 by means of the spring 36 attached to the arm 35, and a very small floating gap of not larger than 0.1 $\mu$m is formed by controlling the balance between a floating force induced by the rotation of the magnetic disk 32 and the urging force of the arm 35 induced by the spring 36.

Therefore, in the magnetic disk unit wherein the memory capacity is to be increased, it is necessary to make the magnetic head floating height and bit cell (unit of recording information) smaller for the purpose of attaining a higher recording density of the magnetic disk. As mentioned above, however, there are many conditions to be satisfied; for example, the floating gap through air film should be controlled by controlling the action of dynamic pressure created with rotation of the magnetic disk 32 and by controlling the biasing force of the spring 36 attached to the arm 35, the surface of the magnetic disk 32 should be formed uniformly, smoothly with an accuracy in the unit of nanometer and that flatwise, and the environment should be kept clean so that a foreign matter which affects the floatability is not present between the magnetic head 33 and the magnetic disk 32. Thus, it is very difficult to effect a relative motion of the head 33 and the disk 32 stably within the narrow floating gap.

In the prior art described above, for attaining a high memory capacity of the magnetic disk unit, there is adopted a remedial measure such as remedying the low floating stability of the magnetic disk and improving the characteristics of the CSS mechanism, or adoption of a substrate having improved surface roughness and surface shape of its textured surface with a reduced grain size for attaining a floating gap, or a floating height, of 0.1 $\mu$m or smaller to improve the magnetic charateristics, or diminishing microprotrusions by head burnishing after formation of a thin film on a substrate, or improving the spring structure of the arm with the magnetic head fixed thereto. However, all of these remedial measures are unsatisfactory for attaining a stable floating characteristic.

It is the object of the present invention to achieve a minimum distance between a magnetic head element as a constituent of a magnetic head and a recording medium surface of a magnetic disk, which is necessary for attaining a high recording density of a magnetic disk unit.

For minimizing the distance between the magnetic head element of the magnetic head and the recording medium surface of the magnetic disk it is necessary to use means which records and reads out information in a contacted state of the magnetic head with the surface of the magnetic disk.

For attaining the function of the magnetic disk unit in such contacted state of the magnetic head with the magnetic disk, there remain the following problems to be solved.

(1) Since the magnetic disk and the magnetic head are allowed to slide relative to each other in a mutually contacted state, the floating surface shape of the conventional magnetic head causes an increase of the friction force to the extent that the magnetic disk can no longer rotate. Therefore, it is necessary to decrease the friction force.

(2) According to the shape of the conventional magnetic head, the magnetic head moves away from the magnetic disk surface even if the force (heretofore 0.08 to 0.1N (newton)) of the spring is increased in the case where the number of revolutions of the magnetic disk is in the range of 4,000 to 6,000 rpm. Further, in a particular surface shape of the magnetic disk, the magnetic head moves away from the magnetic disk in an instant. Once the magnetic head element as a constituent of the magnetic head and the magnetic disk are spaced apart from each other, it is no longer possible to write and read information and there usually occurs a defect called drop-out. Therefore, it is necessary to let the magnetic head perform a relative motion stably in a contacted state with the surface of the magnetic disk.

(3) Since the magnetic head normally slides on the magnetic disk surface, it is presumed that the generation of heat and wear caused by the friction force will become greater than in the use of the conventional CSS mechanism.

Therefore, it is necessary to improve the material and shape of the magnetic head and surface properties of the magnetic disk so as to make heat and wear difficult to occur.

SUMMARY OF THE INVENTION

From the above standpoint it is necessary to use such shape and material of the magnetic head and surface properties of the magnetic disk as will permit the magnetic head to write and read information with respect to the disk surface in a mutually contacted state.

First, the area of contact between the magnetic head and the magnetic disk is made small for decreasing the friction force. The magnetic head has a spherical surface or has a contour similar to an edge shape of an ax, and the magnetic head element for writing and reading information is formed in a position in which it becomes closest to the magnetic disk surface at the time of recording or reading information. At this time, a change in posture of the magnetic head caused by its sliding motion relative to the magnetic disk is taken into account. Also as to the shape of the magnetic disk surface, there is selected a surface shape which reduces the area of contact with the magnetic head. Further, the surface of the magnetic head and that of the magnetic disk are formed using a material which reduces the friction force.

In order to permit the magnetic disk to slide stably in contact with the surface of the magnetic disk even in a high-speed rotation of the magnetic disk, the disk should have a smooth surface and a high degree of flatness, and the rigidity of the spring for supporting the magnetic head is made high. Particularly, in connection with the surface waviness in the circumferential direction of the disk which affects the follow-up property of the magnetic head, there is adopted a surface shape of the magnetic disk diminished in surface waviness, ranging in wavelength from several ten micron meters to several ten millimeters.

Against the generation of heat induced by the friction force there is formed a lubricating film between the magnetic head and the magnetic disk. With the conventional liquid lubricant, there is a problem in point of long-time reliability because it is scattered by the rotation of the magnetic disk. In view of this point there is adopted a lubricant composition which assumes a solid state while the magnetic head does not slide and which is liquefied when the magnetic head slides. As liquefying means, there is adopted a method which utilizes the heat generated by the sliding motion of the magnetic head, or means for liquefying the magnetic head sliding track is provided on the magnetic head side.

The magnetic head and the magnetic disk are each formed using a material high in thermal conductivity and have respective surface structures which permit radiation of heat.

BRIEF DESCRIPTION OF THE DRAWINGS

FIGS. 3($a$) to 3($c$) and FIG. 3($a$)' are schematic diagrams explanatory of the operation of a conventional floating type magnetic head;

FIG. 4 is a diagram explanatory of texture machining for a magnetic disk substrate;

DESCRIPTION OF THE PREFERRED EMBODIMENTS

Figure 1:
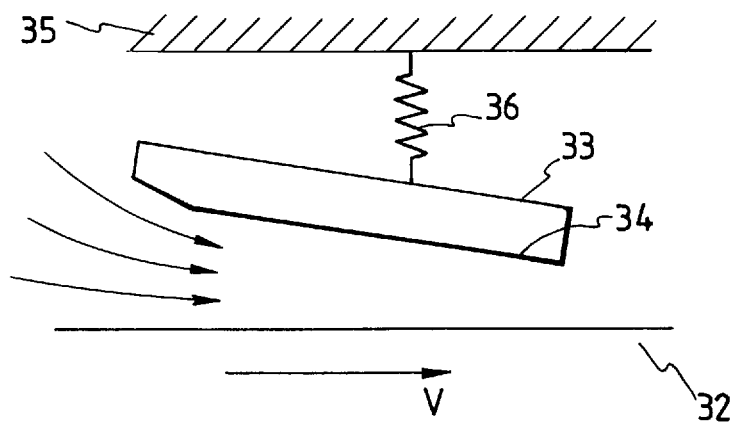
FIG. 1 is a schematic diagram explanatory of the operation of a conventional floating type magnetic head.
Figure 2:
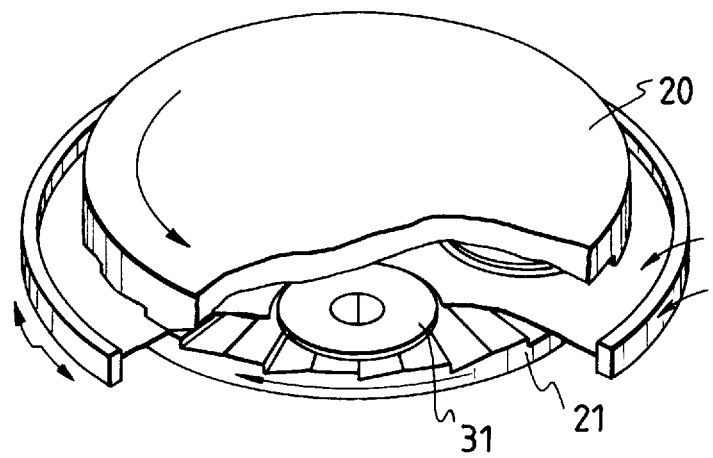
FIG. 2 is a diagram explanatory of substrate machining for a magnetic disk.
Figure 5:
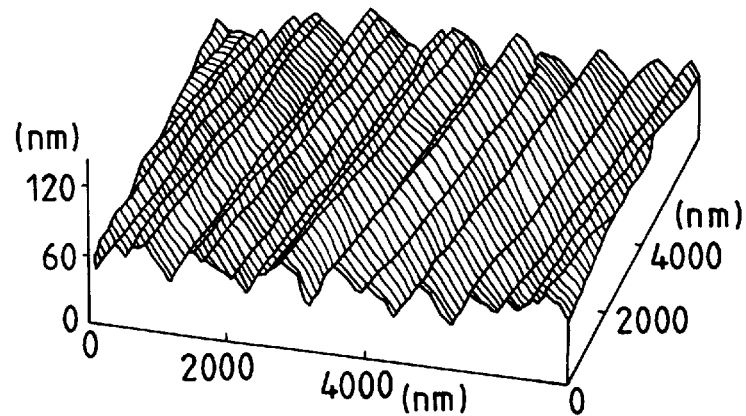
FIG. 5 is an enlarged diagram showing the surface of the magnetic disk substrate after application of the texture machining thereto.
Figure 6A:
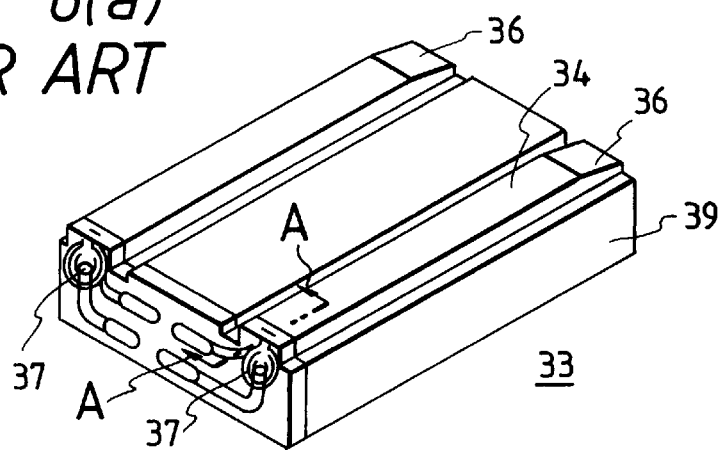
FIGS. 6($a$) and 6($b$) are diagrams explanatory of the conventional floating type magnetic head.
Figure 6B:
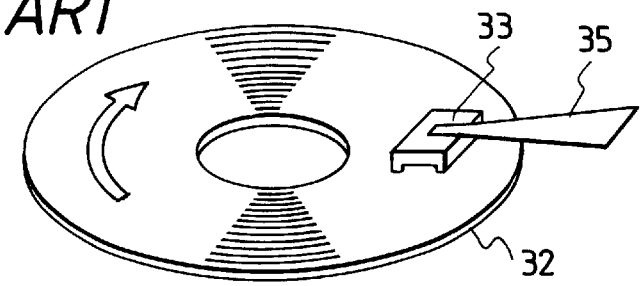

In order to achieve the above-mentioned object, in one aspect of the present invention there is provided a head contact type magnetic disk unit wherein a magnetic head performs a relative motion in contact with a magnetic disk with a lubricant layer formed on the surface thereof to write and read out information.

In another aspect of the present invention there is provided a head contact type magnetic disk unit with a lubricant applied to the surface of a magnetic disk to form a lubricant layer.

In a further aspect of the present invention there is provided a head contact type magnetic disk unit wherein a magnetic head having a sliding surface which is in the shape of a curved surface or in an edge shape of an ax performs a relative sliding motion on the surface of a magnetic disk through a lubricant layer.

In a still further aspect of the present invention there is provided a contact type magnetic disk unit wherein on the magnetic disk surface is formed a lubricant layer which is liquefied during sliding motion of a magnetic head and is thereafter solidified when the head does not slide.

In a still further aspect of the present invention there is provided a head contact type magnetic disk unit wherein a lubricant is applied to a magnetic disk surface, the lubricant being bonded to a magnetic head with a adhesive force weaker than its adhesive force for the magnetic disk surface.

In a still further aspect of the present invention there is provided a head contact type magnetic disk unit wherein a magnetic disk has a surface formed of a material whose adhesive force for a lubricant is strong, while a magnetic head has a surface formed of a material whose adhesive force for the lubricant is weaker than the adhesive force for the magnetic disk.

In a still further aspect of the present invention there is provided a head contact type magnetic disk unit wherein a magnetic head has a convex curvature and its radius of curvature is changed by heat generated by contact and relative motion of the head with respect to a magnetic disk.

In a still further aspect of the present invention there is provided a head contact type magnetic disk unit wherein a magnetic head has a spherical sliding surface, and a magnetic head element as a constituent of the magnetic head is formed in a position closer to an end portion than to the central portion of the magnetic head.

In a still further aspect of the present invention there is provided a head contact type magnetic disk unit having a semiconductor laser mounted on a magnetic head fixing arm.

In the magnetic disk unit according to the present invention, the magnetic head comes into contact with the magnetic disk through a lubricant layer formed on the disk surface and performs a relative motion to write and read out information.

In the magnetic disk unit according to the present invention, a lubricant is applied to the magnetic disk surface to form a lubricant layer, and the magnetic head having a curved sliding surface or a sliding surface of an ax edge shape performs a relative sliding motion on the magnetic disk surface through the lubricant layer.

In the magnetic disk unit according to the present invention, the lubricant layer formed on the magnetic disk surface is liquefied during sliding motion of the magnetic head and is solidified when the head does not slide.

In the magnetic disk unit according to the present invention, the lubricant applied to the magnetic disk surface bonds to the magnetic head with an adhesive force weaker than the adhesive force for the disk surface.

In the magnetic disk unit according to the present invention, the magnetic head has a convex curvature and its radius of curvature is changed by heat generated by contact and relative motion of the head with respect to the magnetic disk.

In the magnetic disk unit according to the present invention, the magnetic head has a spherical sliding surface, and a magnetic head element which constitutes the magnetic head is formed in a position somewhat deviated toward an end portion from the central portion of the head. With motion in the lubricant layer, the magnetic head element approaches the magnetic disk surface.

Further, in the magnetic disk unit according to the present invention, the lubricant layer located in front of the magnetic head is heated and liquefied with a beam of light radiated from the semiconductor laser mounted on the magnetic head fixing arm.

Embodiment 1

Figure 7:
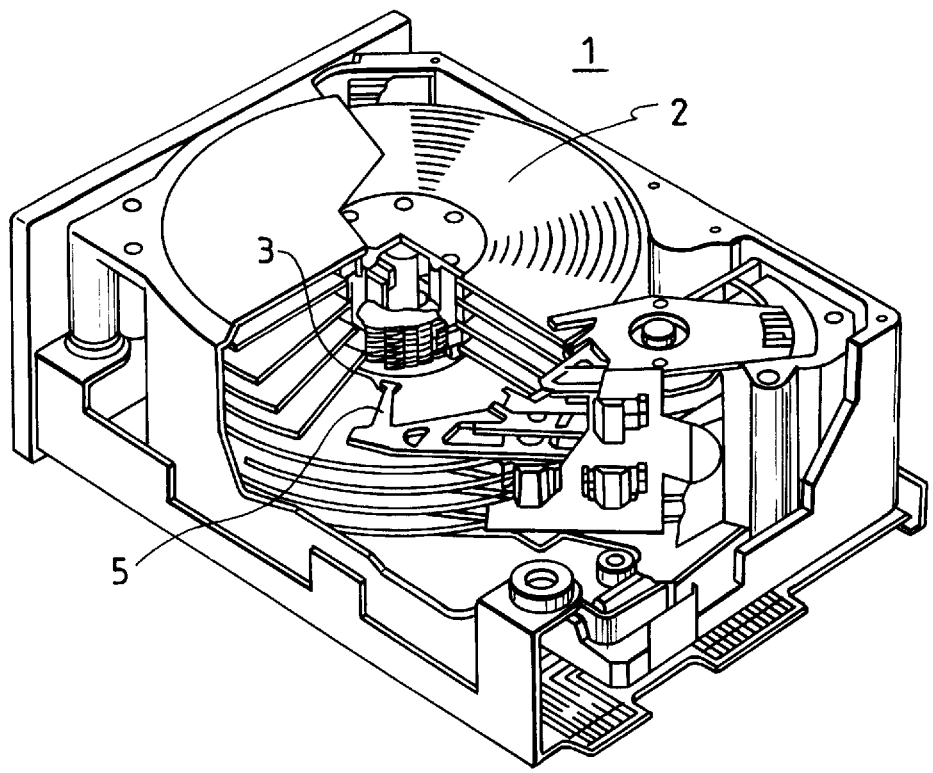
FIG. 7 illustrates a magnetic disk unit, showing (a part of) internal construction, according to the present invention.

The first embodiment of the present invention will now be described with reference to FIGS. 7 to 10. FIG. 7 illustrates a magnetic disk unit 1 according to the present invention. The disk unit 1 comprises a plurality of magnetic disks 2 each comprising a magnetic disk substrate and a magnetic film, a protective layer and a lubricant layer which are formed thin on the substrate, a plurality of magnetic heads 3 each having a slider surface with a protective layer formed thereon and having a predetermined curvature, and a plurality of arms 5 for supporting and fixing thereto the magnetic heads 3 through springs, respectively. Each magnetic head 3 is pushed against the surface of the associated magnetic disk 2 by virtue of the spring of the associated arm 5, and with rotation of the magnetic disk 2, the magnetic head 3 performs a relative motion in a contacted state with the disk surface to write and read out information with respect to the magnetic film of the magnetic disk 2.

Figure 8:
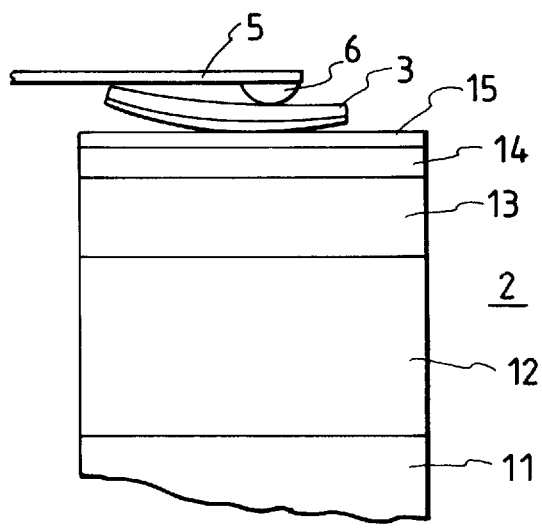
FIG. 8 is a schematic explanatory diagram showing a magnetic disk and a magnetic head according to the present invention.

The magnetic disk 2 is constructed as follows. As shown in FIG. 8, an aluminum disk (e.g. outside diameter 65 mm, inside diameter 20 mm, thickness 0.88 mm) 11 is plated (e.g. Ni-P, nickel-phosphorus, plating, also in the following) as indicated at 12 to a thickness of, say 5 μm or so, followed by both-side grinding and polishing to a surface irregularity of several nanometers and a surface roughness of not greater than 0.2 nmRa, then on the magnetic disk substrate thus obtained there are formed a Co-Cr (cobalt-chromium) magnetic film 13 of, say, 40 nm in thickness by sputtering, a protective layer 14 from diamond-like carbon of, say, 20 nm in thickness by chemical vapor deposition (hereinafter referred to as CVD), and a lubricant layer 15 of, say, 10 nm in thickness by spin-coating a fluorinated polymer lubricant for example in a liquefied state at a high temperature.

Before formation of the lubricant layer 15, since the magnetic film 13 and the protective layer 14 are very thin, the surface shape of the magnetic disk substrate is transferred well to them, providing a surface shape almost the same as that of the magnetic disk substrate. As to the surface shape of the magnetic disk 2 after formation of the lubricant layer 15, a change was recognized in a fine irregularity smoothing direction as a result of observation using a scanning electron microscope, but as a result of observation using a surface roughness tester, there was recognized little change.

Figure 9A:
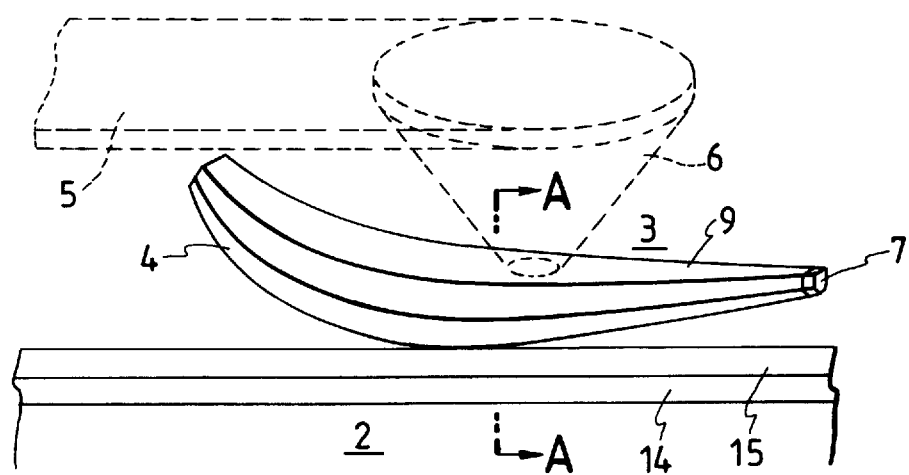
FIGS. 9($a$) and 9($b$) are structural diagrams of a contact type magnetic head according to the present invention.

As shown in FIG. 9(a), the magnetic head 3 is smaller in its sectional shape at both end portions thereof, and a magnetic head element 7 as a constituent of the magnetic head 3 is formed at one end of the head 3. A slider surface 4 of the head 3 for relative sliding motion with respect to the magnetic disk 2 has a predetermined curvature.

Figure 9B:
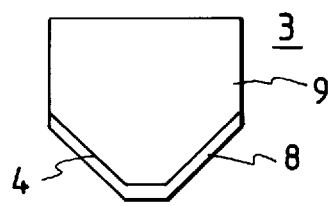

A slider 9 which constitutes the magnetic head 3 is formed of a ceramic material, e.g. alumina titanium carbide, and its central section (A—A) is in a tapered convex shape (an ax edge shape) so as to reduce the area of contact with the magnetic disk, having a size of, say, 0.5 mm wide by 0.5 mm high, as shown in FIG. 9(b). The slider surface 4 for the magnetic disk 2 is tapered, with a sliding width being set at, say, 0.2 mm. A protective layer 8 is formed on the slider surface 4 by sputtering at a thickness of, say, 10 nm.

The magnetic head 3 is supported in a position near its central part by means of an arm 5 through a spring 6 (see FIG. 9(a)) so as to be stabilized its posture.

Figure 10:
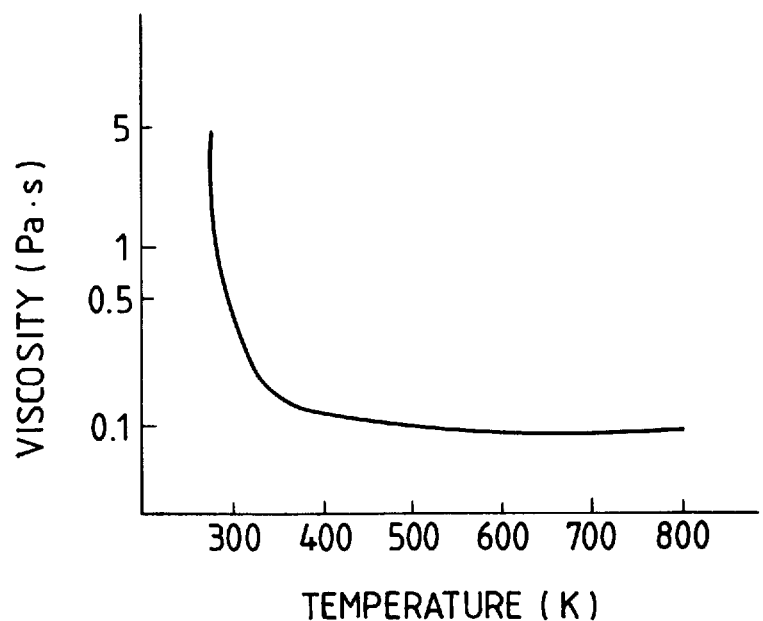
FIG. 10 is a temperature characteristic diagram of a lubricant layer according to the present invention.
Figure 11:
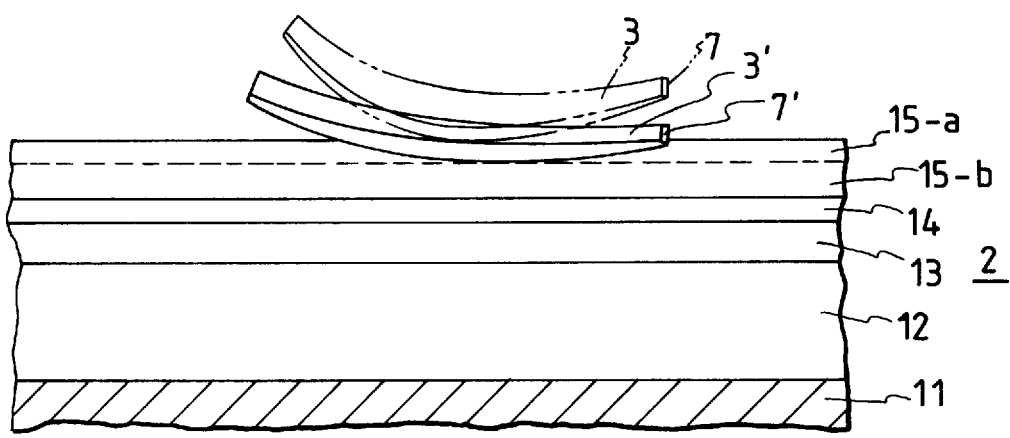
FIG. 11 is a diagram explanatory of a magnetic head having a contour similar to an edge shape of an ax and adapted to change in its shape with temperature according to the present invention.

The lubricant layer 15 applied to the magnetic disk 2 is solid at ordinary temperatures and is liquefied at specific temperatures, as shown in FIGS. 9(a), 10 and 11. It assumes a liquid state under a heat of about 600K to 800K which is generated with sliding motion of the magnetic head 3 on the disk 2 (in this case the reference numeral 3 corresponds to 3'). The thickness of this liquefied layer is about 5 nm, which is about half of the thickness of the lubricant layer 15. Therefore, the magnetic head 3 travels through the thus-liquefied lubricant layer 15 (incl. 15a and 15b).

Upon operation of the magnetic head 3 and magnetic disk 2 having the above structures and characteristics, the head 3 slides on the disk 2 with rotation of the disk, so that the skin portion of the lubricant layer 15 on the disk surface is liquefied by the heat induced by the sliding motion, and the head 3 travels through the liquid to write or read out information.

When the magnetic head 3 seeks in the radial direction of the magnetic disk 2, the sliding heat is eliminated in the slid track of the head 3 and the temperature drops, resulting in that the lubricant layer 15 is solidified again. Consequently, there no longer occurs the rotational scattering of the lubricant which has heretofore been a problem in the use of a liquid lubricant, whereby the life of the lubricant is greatly improved.

Embodiment 2

Figure 12:
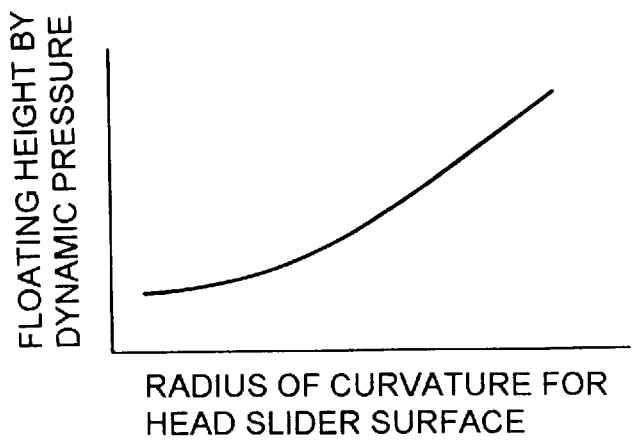
FIG. 12 illustrates a relationship between the radius of curvature of a magnetic head slider surface and the height of floating induced by a dynamic pressure.

The second embodiment of the present invention will now be described with reference to FIGS. 11 and 12. A slider 9 (see FIG. 9(a)) which constitutes a magnetic head 3 is formed of a ceramic material whose radius of curvature varies with temperature. The magnetic head 3, which is in an ax edge shape having a radius of curvature of 100 mm in the longitudinal direction thereof, is pushed against the surface of a magnetic disk 2 by means of a spring 6 (see FIG. 9(a)) in the same manner as in embodiment 1, and with rotation of the magnetic disk 2, the head 3 slides on the disk surface. As the temperature of the magnetic head 3 rises under the heat generated by such sliding motion, the radius of curvature of the head varies to a larger value from 3 to 3' as shown in FIG. 11. Thus, with sliding motion of the head 3 on the disk surface and with consequent rise in temperature of the sliding portion of the disk 2, a lubricant layer 15 is liquefied (to 3') and the head 3 travels through the thus-liquefied layer. When it is not necessary to classify as above in the case of change form 3 to 3', the radius of curvature may be indicated generally by 3.

The temperature of the magnetic head 3 also rises as the sliding motion relative to the magnetic disk 2 proceeds, so that the radius of curvature of the head changes largely to 3'. The relation between the radius of curvature of the head 3 and its floating height in the liquid, namely the relation between the radius of curvature of the head and the floating height based on a dynamic effect induced by the head-disk relative motion through the liquid, is as shown in FIG. 12 in which the floating height becomes larger with increase in the radius of curvature. As the floating height of the magnetic head 3 in the lubricant layer 15 becomes larger, the friction force for the disk surface becomes smaller, so that the temperature of the head 3 drops (to 3') and the radius of curvature of the head again changes to the smaller value of 3 from 3'. This state is repeated until the head-disk relative velocity and the head-disk interface temperature at the said relative velocity become stable, and in this stable condition the magnetic head 3 travels on the disk surface to write or read out information.

Embodiment 3

Figure 13A:
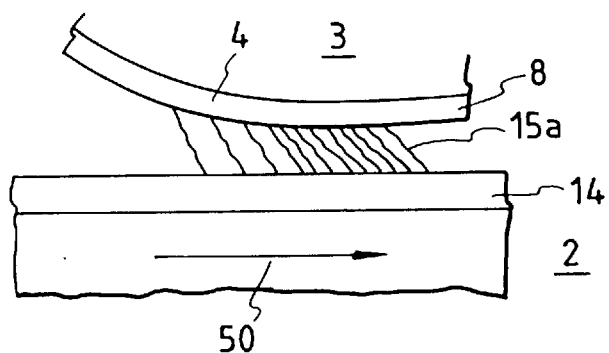
FIGS. 13($a$) and 13($b$) are schematic explanatory diagrams of a magnetic disk and a magnetic head, using a liquid lubricant layer, according to the present invention.
Figure 13B:
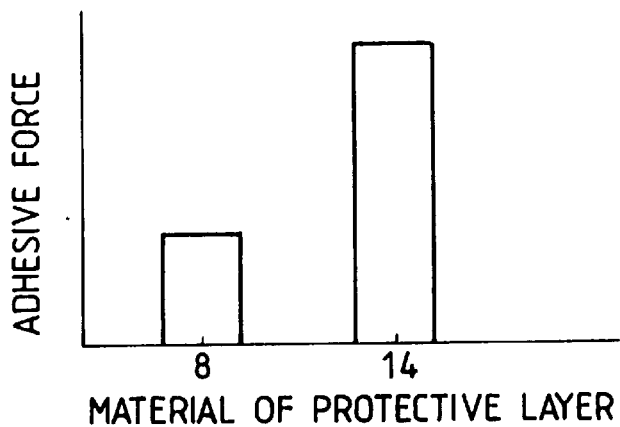

A magnetic disk unit according to the third embodiment of the present invention will now be described. In this magnetic disk unit, as shown in FIGS. 13(a) and 13(b), a liquid lubricant layer 15a is interposed between a magnetic head 3 and a magnetic disk 2, and the head 2 is allowed to travel in contact with the surface of the disk 2. The head 3 and the disk 2 have respective surface films different in adhesive force from the lubricant layer 15a.

In place of the lubricant layer 15 on the magnetic disk 2 mentioned in embodiment 1 there is used the liquid lubricant layer 15a which is a fluorine-based lubricant layer, and on the surfaces of the magnetic head 3 and the magnetic disk 2 there are formed protective layers 8 and 14, respectively, which are the same as the projective layers 8 and 14 illustrated in FIG. 8 and FIGS. 9(a), 9(b).

More specifically, as shown in FIGS. 13(a) and 13(b), for example a layer of a diamond-like carbon having a strong adhesive force for the lubricant layer 15a is formed as the protective layer 14 on the surface of the magnetic disk 2 by CVD, while a layer of sputtered carbon whose adhesive force for the lubricant layer is weaker than that of the diamond-like carbon is formed as the protective layer 8 on a slider surface 4 of the head 3.

When the magnetic head 3 travels on the disk surface, it performs a relative motion while floating under a dynamic effect as explained above in embodiment 2. As the relative velocity increases, the disk surface and the head act to move away from each other, and if the ambient air is present between the two, the magnetic head 3 will move away from the disk surface under the action of a dynamic pressure of the air.

In this embodiment, the boundary energy of the lubricant layer 15a is utilized to prevent the magnetic head 3 from moving away from the magnetic disk 2, and through the relative motion of the head 3 and disk 2, the lubricant layer 15a adheres to the one stronger in adhesive force of the head and the disk surface, while it goes away from the one weaker in the adhesive force.

Embodiment 4

The fourth embodiment of the present invention will now be described with reference to FIGS. 14(a) and 14(b). A magnetic head 3 having a spherical slider surface 4 with a radius of curvature of 50 mm is allowed to perform a relative motion on the surface of a magnetic disk 2 in the manner mentioned in embodiment 1 to write and read out information.

Figure 14A:
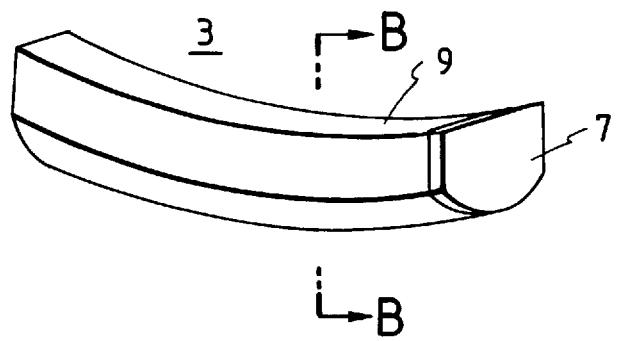
FIGS. 14($a$) and 14($b$) are partial construction diagrams of a magnetic head having a spherical slider surface according to the present invention.
Figure 14B:
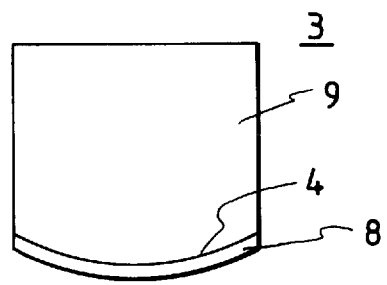

As shown in FIGS. 14(a) and 14(b), for example alumina titanium carbide is machined into a slider 9 having a width of 0.5 mm, a height of 0.5 mm and a radius of curvature of the slider surface 4 of 50 mm, the slider 9 constituting the head 3, and the head length and its radius of curvature in the longitudinal direction are set at 1 mm and 50 mm, respectively.

A magnetic head element 7 for writing and reading information is formed at an end of the slider 9, and a carbon layer is formed as a protective layer 8 on the slider surface 4 to a thickness of, say, 10 nm by sputtering.

Though not shown, while being supported by an arm 5 through a spring 6 in the same way as in the previous embodiments, for example as indicated by a dotted line in FIG. 9(a), and pushed against the surface of the magnetic disk 2 and sliding on the disk surface as in the previous embodiment 1 together with rotation of the disk 2, the magnetic head element 7 which constitutes the magnetic head 3 records or reads out information.

Embodiment 5

The fifth embodiment of the present invention will now be described with reference to FIG. 15. A magnetic head element 7a is formed in a position somewhat deviated toward the left end from the central part of a magnetic head 3 which has a spherical slider surface 4a with a radius of curvature of 50 mm, and as described in embodiment 1, it is allowed to perform a relative motion on the surface of a magnetic disk 2 to write or read out information.

Figure 15:
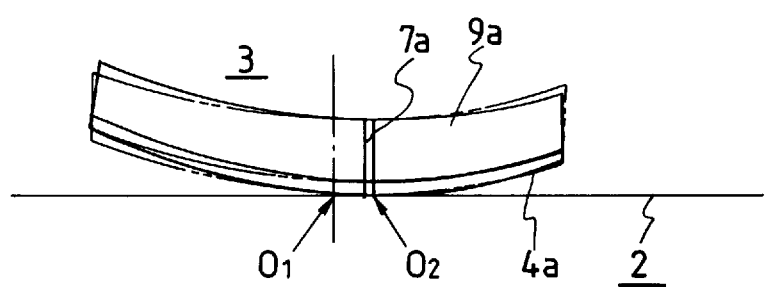
FIG. 15 is a partial construction diagram of a magnetic head having a magnetic head element disposed near the center of the head.

The magnetic head 3 has the same material and shape as in embodiment 4, and as shown in FIG. 15, the magnetic head element 7a is formed in a position somewhat deviated toward the left end from the central part indicated at $0_1$ of the head 3.

When the magnetic head 3 having the spherical slider surface 4a is moved through the lubricant layer 15, the posture of the spherical slider surface 4a for the magnetic disk 2 changes from its broken-line state to its solid-line state, and the point closest to the disk surface changes from $0_1$ to $0_2$.

For improving the information writing and reading efficiency, therefore, the position of the magnetic head element 7a of the magnetic head 3 is set at a point closest to the disk surface in the moving state of the head and disk relative to each other.

The said point can be analyzed from a pressure distribution in the relative motion of the spherical surface and the lubricant layer and it is advantageous in that the design of the magnetic head is easy and that the error in the manufacturing process is diminished. Further, the mounting position of the spring 6 which has a great influence on the posture control for the magnetic head 3 can be set at the central part of the head, whereby the mounting error can be diminished and the influence of dispersion in the components of the head 3 can be minimized.

Embodiment 6

The sixth embodiment of the present invention will now be described with reference to FIG. 16, etc. The present invention is concerned with a magnetic disk unit wherein a magnetic head 3 having a curvature and with a protective layer 8 formed on its slider surface 4 is pushed against the surface of a magnetic disk 2 with a solid lubricant layer 15 applied thereto, by means of an arm 5 (indicated by a dotted line) which supports the head 3 through a spring 6, and with rotation of the magnetic disk 2, the head 3 performs a relative motion in a contacted state with the disk surface through the lubricant layer 15 which has been liquefied, to write and read information with respect to a magnetic film formed on the disk 2.

For liquefying the lubricant layer 15 (see FIG. 9(a), etc.) on the disk surface at the time of passing therethrough of the head 3, a beam of light is radiated to the front of the passing head 3 to generate heat and this heat is utilized for the liquefaction.

Figure 16:
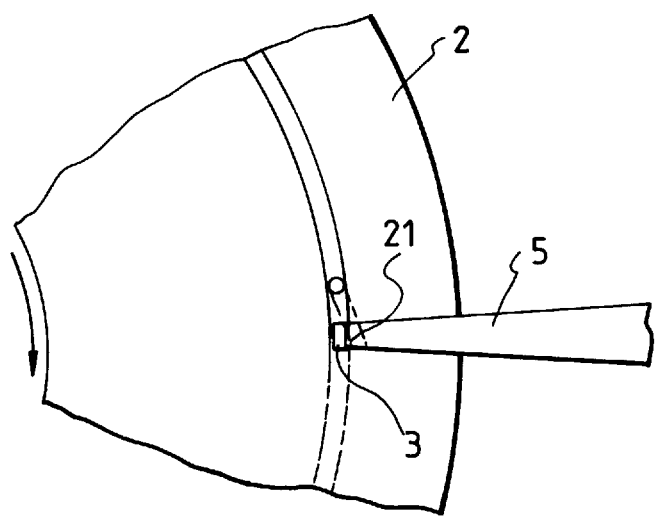
FIG. 16 is a partial construction diagram of a magnetic disk unit with a semiconductor laser mounted on a magnetic head supporting arm according to the present invention.

As shown in FIG. 16, a semiconductor laser 21 is mounted on the arm 5 which supports the magnetic head 3 described in embodiment 1 through the spring 6 (see FIG. 9(a), etc.), and a laser beam is emitted over an area of, say, 0.5 mm in diameter from the semiconductor laser to liquefy the lubricant layer 15 which is, say, 10 nm in thickness.

The liquefying area and depth of the lubricant layer 15 can be controlled by changing laser beam radiating conditions. After the magnetic head 3 has traveled through the liquefied lubricant layer 15, the temperature of the lubricant layer drops due to transfer of the heat to the surroundings, so that the lubricant layer solidifies again. Therefore, the scattering of lubricant layer with rotation of the magnetic disk 2 which occurs in the use of the conventional liquid lubricant layer 15a (see FIG. 11, etc.) no longer occurs, whereby the wear of the lubricant layer 15 (or 15a or 15b) can be diminished to a great extent.

Although in each of the above embodiments reference has been made to a magnetic disk unit comprising a magnetic disk obtained by forming a magnetic film, a protective layer and a lubricant layer on a plated aluminum disk substrate and a magnetic head constituted by a slider formed of alumina titanium carbide, the material of the substrate for the magnetic disk may be a ceramic material such as aluminum alloy, glass, silicon or alumina, or the substrate may be subjected to plating as mentioned above to form an undercoat, or a thin film of Cr or Ti may be formed thereon.

Also as to the magnetic head, the material of the slider which constitutes the head may be a ceramic material such as zirconia, Mn-Zn (manganese-zinc) or Ni-Zn (nickel-zinc).

The shape of the slider surface 4 of the magnetic head (see FIGS. 9(a), 9(b), etc.) may be a curved surface of second or third order which does not have a constant curvature, and even with a surface such as this there can be attained the same effects as above.

The composition of the lubricant layer is not specially limited if only it possesses the property of changing from solid to liquid. Although in the above embodiments reference has been made to the lubricant layer which undergoes such conversion thermally, there also may be used a material which undergoes such conversion under the radiation of light or under vibration, and also in this case there can be obtained the same effects as above. Even in the case of a liquid lubricant layer, if it is difficult to scatter under rotation, there will be obtained the basic effect of the present invention.

In the present invention, since the information writing and reading operation for the magnetic film is performed in a contacted state of the magnetic head with the magnetic disk surface, the distance between the magnetic head element as a constituent of the magnetic head and the magnetic film can be greatly shortened in comparison with that in the prior art, whereby the recording density of the magnetic disk can be enhanced to a remarkable extent, and hence the memory capacity of the magnetic disk unit increases greatly.

According to the prior art, for shortening the distance, hm, between the magnetic head element of the magnetic head and the magnetic film of the magnetic disk, there have been adopted such means as making the surface properties of the magnetic disk more precise, improving the follow-up properties of the magnetic head supporting system and improving the surface shape of the magnetic head, as mentioned above. More particularly, by making the distance hm smaller from 0.16 $\mu$m to 0.15 $\mu$m, the recording density has been increased from 50,000 BPI to 70,000 BPI and the recording density in the radial direction, namely the density per track, has also increased from 2,900 TPI to 3,200 TPI. Consequently, the memory capacity of the magnetic disk unit can be approximately doubled.

According to the present invention, since information is recorded and read out in a contacted state of the magnetic head with the magnetic disk surface, the distance, hm, between the magnetic head element as a constituent of the magnetic head and the magnetic film of the magnetic disk can be greatly shortened to not larger than 0.03 $\mu$m, so that the recording density of the magnetic disk can be enhanced. Consequently, the memory capacity of the magnetic disk unit can be increased to twenty times or more as large as that in the prior art.

Moreover, in comparison with the conventional floating type magnetic head which requires control for its floating in a very narrow space of 0.1 $\mu$m or less, the magnetic disk used in the magnetic disk unit of the present invention performs a relative motion on the magnetic disk surface while being kept in contact with the disk surface, so the structure of the head supporting system can be simplified and the cost thereof reduced; besides, there can be attained improvement of its reliability.

Further, according to the prior art, if dust is present between the magnetic head and the magnetic disk, it greatly affects the floating stability of the head, and this has been an important subject to be attained for improving the reliability of the magnetic disk unit. In the present invention there is no fear of entry of ambient dust between the head and the disk, and therefore the sliding motion of the head causes no trouble.

What is claimed is:

1. A frictionally sliding head magnetic disk apparatus having a magnetic head and a magnetic disk, wherein the magnetic head is in continuous contact with the disk during read/write operation, the apparatus comprising:

a lubricant layer being a top surface of the magnetic disk wherein said lubricant layer is liquefied by frictional heat induced during a frictionally sliding motion of the magnetic head in continuous contact, during read/write operations, with said surface of said magnetic disk and to solidify when the magnetic head stops on the surface thereof, and said lubricant layer having stronger adhesive force for said magnetic disk than that for said magnetic head.

2. The frictionally sliding head magnetic disk apparatus according to claim 1, wherein said lubricant layer is liquefied by said frictional heat induced during the frictional sliding motion between said magnetic disk and said sliding magnetic head.

3. The apparatus according to claim 2 wherein the lubricant layer is adapted to liquefy under a heat of approximately 600K° or greater generated by the relative sliding motion of the magnetic head and magnetic disk.

4. The apparatus according to claim 2 wherein the magnetic head and magnetic disk are configured such that the magnetic head travels through the liquefied lubricant to write or read out information from the magnetic disk.

5. A frictionally sliding head magnetic disk apparatus according to claim 1, wherein the magnetic head has a convex curvature and is formed so that a radius of the curvature varies under the frictional heat generated by the relative sliding motion of the magnetic head and the magnetic disk.

6. The frictionally sliding head magnetic disk apparatus according to claim 5, wherein the magnetic head has a spherical slider surface, and a magnetic head element as a constituent of the magnetic head is formed at a location such that the lubricant layer of the magnetic disk and an additional area of the convex curvature come into contact after the thermal variation resulting from the relative motion of the magnetic head contacting the magnetic disk.

7. The apparatus according to claim 5 wherein the magnetic head is constructed such that the radius of the convex curvature of the magnetic head increases as the frictional heat increases and wherein the radius of the convex curvature of the magnetic head decreases as the frictional heat decreases.

8. The apparatus according to claim 1 wherein the lubricant layer is 10 nm in thickness in a solidified state and 5 nm in thickness when in a liquefied state.

9. The apparatus according to claim 1 wherein the lubricant is further constructed such that only a section of the lubricant on the magnetic disk which is substantially within a slide track of the magnetic head, and thereby heated by sliding heat, is liquefied.

10. The apparatus according to claim 9 wherein the magnetic head is adapted to move in a lateral direction of the magnetic disk, whereby movement in the lateral direction from a first slide track to a second slide track removes the sliding heat from the first slide track such that the lubricant solidifies in the area of the first slide track and liquifies in the area of the second slide track due to the existence of the sliding heat, whereby scattering of the lubricant is avoided.

11. A frictionally sliding head magnetic disk apparatus having a magnetic head and magnetic disk, wherein the magnetic head is in continuous contact with the disk during read/write operation, the apparatus comprising:

a lubricant applied to a surface of the magnetic disk to form a lubricant layer of the magnetic disk, said lubricant layer liquefied by frictional heat induced during a frictionally sliding motion of the magnetic head in continuous contact, during read/write operations, with said surface of said magnetic disk, said lubricant layer being adapted to adhere to the magnetic head with an adhesive force weaker than the adhesive force for the magnetic disk surface, the magnetic head having a curved slider surface adapted to perform a relative sliding motion on the surface of the magnetic disk through said lubricant layer.

12. The apparatus according to claim 11 wherein the lubricant is further constructed such that only a section of the lubricant on the magnetic disk which is substantially within a slide track of the magnetic head and thereby heated by sliding heat is liquefied.

13. The apparatus according to claim 12 wherein the magnetic head is adapted to move in a lateral direction of the magnetic disk, whereby movement in the lateral direction from a first slide track to a second slide track removes the sliding heat from the first slide track such that the lubricant solidifies in the area of the first slide track and liquifies in the area of the second slide track due to the existence of the sliding heat, whereby scattering of the lubricant is avoided.

14. The apparatus according to claim 11,
wherein the magnetic head is constructed such that a radius of the curved slider surface of the magnetic head increases as frictional heat, generated by relative movement of the magnetic head and magnetic disk, increases and wherein the radius of the curved slider surface decreases as the frictional heat decreases.

15. A frictionally sliding head magnetic disk apparatus having a magnetic head and a magnetic disk, wherein the magnetic head is in continuous contact with the disk during read/write operation, the apparatus comprising:

a lubricant applied to a surface of the magnetic disk to form a lubricant layer of the magnetic disk, said lubricant layer liquefied by frictional heat induced during a frictionally sliding motion of the magnetic head in continuous contact, during read/write operations, with said surface of said magnetic disk, said lubricant layer being adapted to adhere to the magnetic head with an adhesive force weaker than the adhesive force for the magnetic disk surface, the magnetic head having a tapered, convex slider surface adapted to perform a relative sliding motion on the surface of the magnetic disk through said lubricant layer.

16. The apparatus according to claim 15 wherein the lubricant is further constructed such that only a section of the lubricant on the magnetic disk which is substantially within a slide track of the magnetic head and thereby heated by sliding heat is liquefied.

17. The apparatus according to claim 16 wherein the magnetic head is adapted to move in a lateral direction of the magnetic disk, whereby movement in the lateral direction from a first slide track to a second slide track removes the sliding heat from the first slide track such that the lubricant solidifies in the area of the first slide track and liquifies in the area of the second slide track due to the existence of the sliding heat, whereby scattering of the lubricant is avoided.

18. The apparatus according to claim 15, wherein the magnetic head is constructed such that a radius of a tapered convex slider surface of the magnetic head increases as frictional heat, generated by relative movement of the magnetic head and magnetic disk, increases and wherein the radius of the tapered convex slider surface decreases as the frictional heat decreases.

\* \* \* \* \*